(12) United States Patent
McQueen

(10) Patent No.: US 6,621,063 B2
(45) Date of Patent: Sep. 16, 2003

(54) OMNI-DIRECTIONAL OPTICAL CODE READER USING SCHEIMPFLUG OPTICS

(75) Inventor: Alexander M McQueen, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/884,975

(22) Filed: Jun. 21, 2001

(65) Prior Publication Data

US 2002/0195550 A1 Dec. 26, 2002

(51) Int. Cl.$^7$ ................................................ H01L 27/00
(52) U.S. Cl. ............... 250/208.1; 250/234; 235/462.11; 235/462.41
(58) Field of Search ................................ 250/566, 568, 250/234, 235, 236, 208.1; 235/462.09, 462.1, 462.11, 462.24, 462.41, 462.42, 462.01

(56) References Cited

U.S. PATENT DOCUMENTS

| | | | |
|---|---|---|---|
| 4,861,975 A | 8/1989 | Kino et al. ............... 250/201 |
| 4,874,933 A | 10/1989 | Sanner ..................... 235/470 |
| 4,946,234 A | 8/1990 | Sasada et al. ............. 350/6.6 |
| 4,978,860 A | 12/1990 | Bayley et al. ............. 250/568 |
| 5,010,241 A | 4/1991 | Butterworth ............... 235/462 |
| 5,396,054 A | 3/1995 | Krichever et al. ......... 235/462 |
| 5,414,250 A * | 5/1995 | Swartz et al. ............ 235/462 |
| 5,446,271 A | 8/1995 | Cherry et al. ............. 235/462 |
| 5,485,263 A * | 1/1996 | Bjorner et al. ............ 356/4.01 |
| 5,920,060 A * | 7/1999 | Marom ..................... 235/462.2 |
| 6,247,648 B1 * | 6/2001 | Katz et al. ............... 235/462.42 |
| 6,344,893 B1 * | 2/2002 | Mendlovic et al. ......... 356/3.14 |

* cited by examiner

*Primary Examiner*—Stephone Allen
*Assistant Examiner*—Christopher W Glass
(74) *Attorney, Agent, or Firm*—Stoel Rives LLP

(57) ABSTRACT

An optical code reader for reading optical codes in any orientation with a preferred depth of field (DOF), the optical code reader including imaging sensor arrays arranged at angles to one another and tilted in accordance with the Scheimpflug principle to allow for omni-directional reading and a preferred DOF. In addition, an optical code reader may also include an optical device to rotate an image as it is projected upon a stationary tilted image sensor array. Still further, an optical code reader may include a rotating imaging sensor array tilted in accordance with the Scheimpflug principle to allow for omni-directional reading with a preferred DOF.

17 Claims, 13 Drawing Sheets

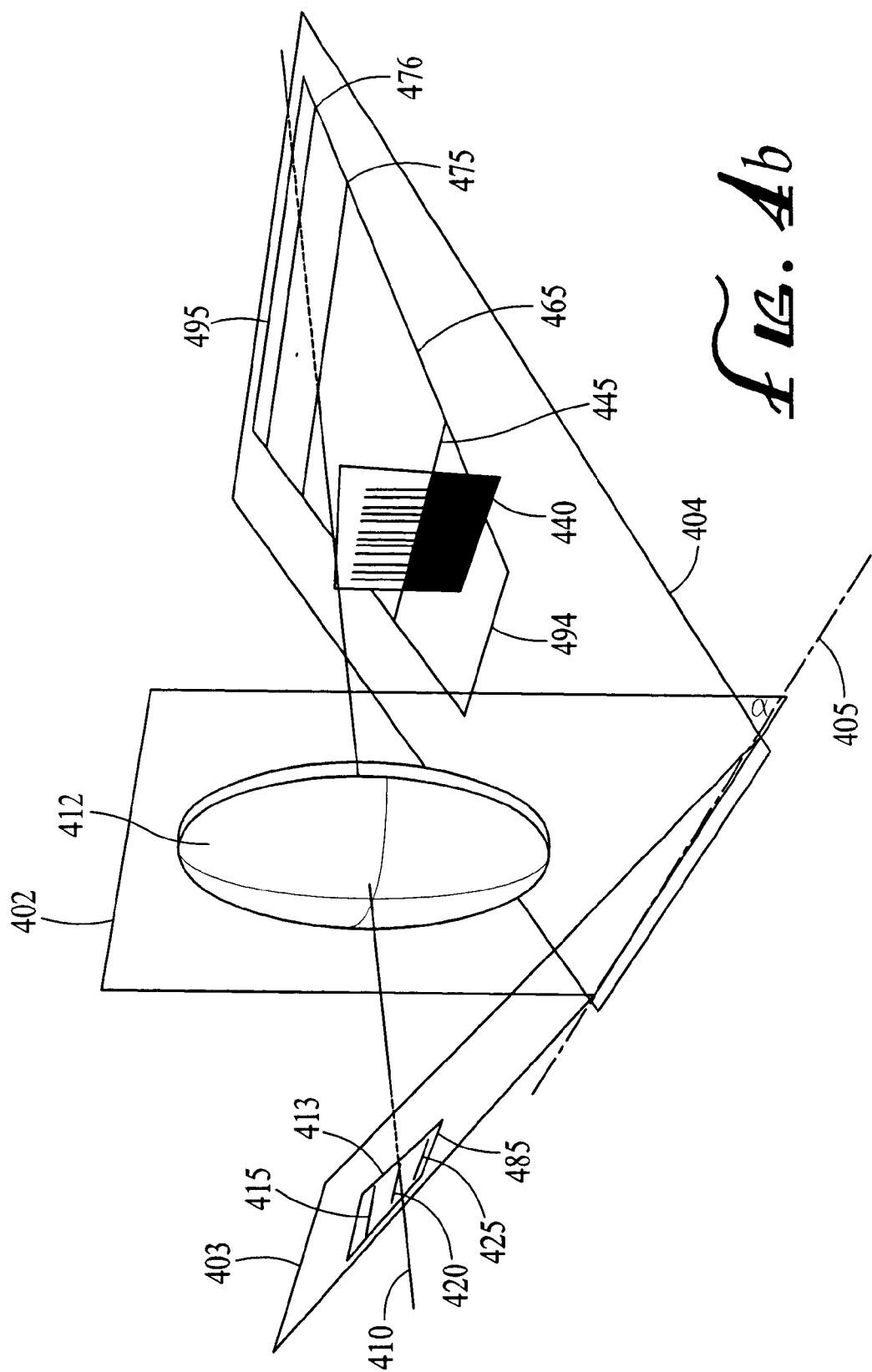

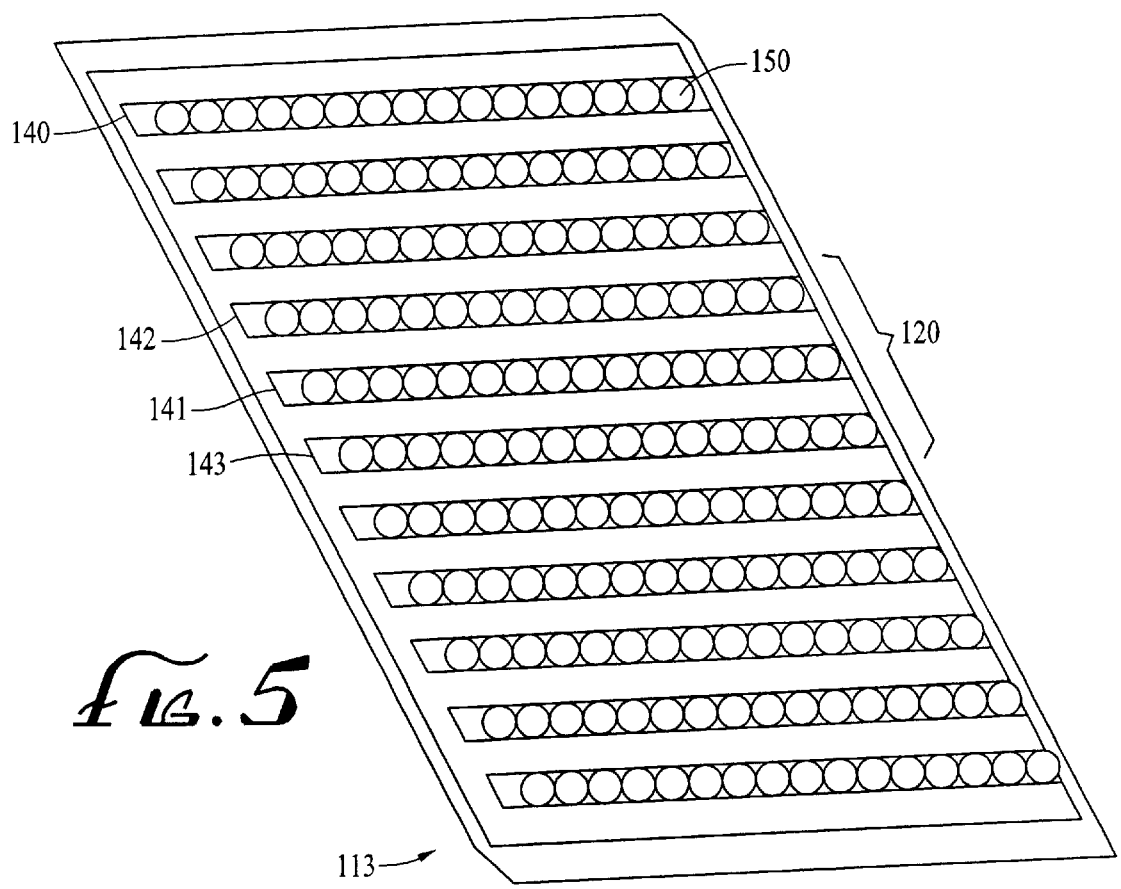

OMNI-DIRECTIONAL OPTICAL CODE READER USING SCHEIMPFLUG OPTICS

BACKGROUND OF THE INVENTION

The field of the present invention relates generally to optical code readers using Scheimpflug optics.

Optical code systems, including for example bar code systems, have come into wide use for marking a great variety of objects for automatic reading. Optical codes are used commercially in many applications, including the identification of retail products at the point of sale, control of inventories, and package identification.

Optical codes include, but are not limited to, a series of light and dark areas of varying widths and heights. The simplest of optical codes are often commonly referred to as one-dimensional (hereinafter 1D) and two-dimensional (hereinafter 2D) bar codes. However, other configurations of light and dark areas may also represent optical codes. An example of such a configuration may be symbolic codes, such as a light and dark area configured in the shape of a lightning bolt to represent electricity. Light and dark areas configured in the shape of alphanumeric text may also be read as an optical code.

Most conventional optical code readers suffer from shallow Depth of Field (DOF). Due to the shallow DOF, optical codes only remain in focus over a narrow range of distances. In addition, most conventional optical code readers have difficulty reading optical codes that are oriented in random directions.

SUMMARY OF INVENTION

The present invention is directed to systems and methods for increasing the DOF of an optical code reader. A preferred configuration comprises an optical reader having Scheimpflug optics to increase the DOF while retaining adequate light levels for efficient optical code signal processing. The optical code reader having Scheimpflug optics further has the capability to read an optical code at a random orientation while providing a preferred DOF for accurate reading. In a preferred embodiment, the optical code reader comprises a plurality of image sensor arrays mounted at an angle in accordance with the Scheimpflug principle to provide a preferred DOF. Each of the plurality of image sensing arrays is oriented in a different direction to provide a plurality of raster patterns. The plurality of raster patterns taken together as one provides a sample-scan line pattern. By creating a complex sample-scan line pattern, omni-directional optical code reading is allowed.

In one preferred configuration, the optical code reader has a rotatable image sensor array in an optical code reader. The rotation of the image sensor array is synchronized with timing of the scan of different raster patterns such that a sample-scan line pattern is created.

In another configuration, the optical code reader has a singular image sensor array set at an angle in accordance with the Scheimpflug principle. This configuration has an optical device provided to rotate the rays of light, which make up an image of the optical code onto the image sensor array. The rotation of the optical device is synchronized with the timing of the scan of different raster patterns such that a sample-scan pattern is created.

These as well as other configurations of the present invention will be apparent to those of skill in the art upon inspection of this specification and the drawings herein.

BRIEF DESCRIPTION OF THE DRAWINGS

FIG. 4b is a 3-D diagram of an imaging system utilizing the Scheimpflug condition shown in FIG. 4a.

FIG. 5 is a diagram of an image sensor array used in an optical code reader.

DETAILED DESCRIPTION OF PREFERRED EMBODIMENTS

Figure 1:
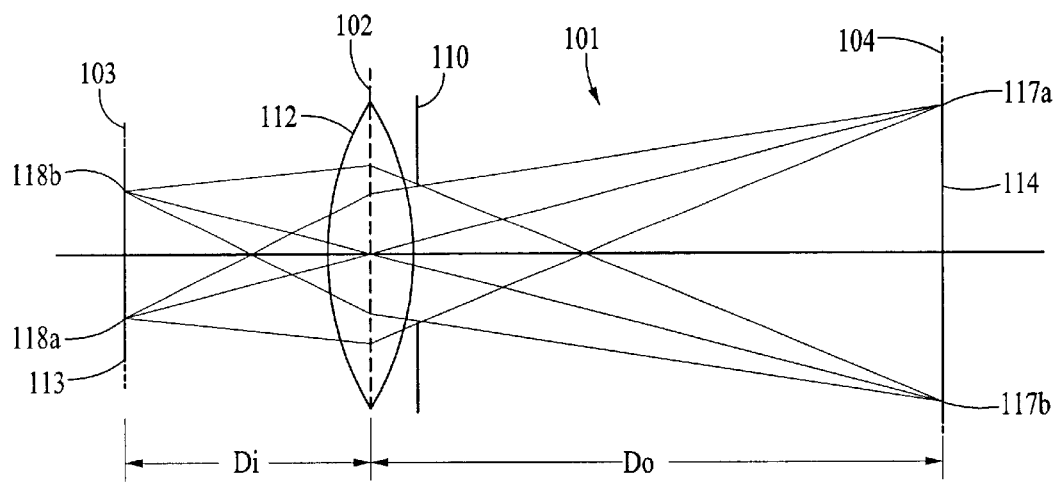
FIG. 1 is a diagram of a conventional imaging system.

The preferred embodiments will now be described with respect to the drawings.

An optical code reader detects reflected and/or refracted light from the code comprising the characters. One common method of illuminating the optical code is by the use of a scanning laser beam. In this method a beam of light sweeps across the optical code and an optical detector detects the reflected light. The detector generates an electrical signal having amplitude determined by the intensity of the collected light.

Another method for illuminating the optical code is by the use of a uniform light source with the reflected light detected by an array of optical detectors, such as a charge-coupled device (CCD) or CMOS image sensor. In such a technique, as with a scanning laser, an electrical signal is generated having amplitude determined by the intensity of the collected light. In either the scanning laser or imaging technique, the amplitude of the electrical signal has one level for the dark areas and a second level for the light areas. As the code is read, positive-going and negative-going transitions in the electrical signal occur, signifying transitions between light and dark areas.

To read a 1D optical code, it is sufficient to take a "snapshot" of the reflected or refracted light anywhere across the entire optical code. To read a 2D optical code, the coded items may be moved manually in front of the reader or automatically, for example, on a moving conveyor belt. As the items marked with an optical code are moved, repeated "snapshots" are taken of the optical code image. These repeated "snapshots" are combined to form a 2D image. Alternatively, the optical code reader may be held by an operator, directed at the optical code and moved across the optical code in a transverse motion. In still another type of optical code reader, a 2D array of CCD elements is used to obtain an entire image of the optical code at one time.

Handheld optical code readers, either laser or CCD, generally require that an operator aim and orient the reader relative to the optical code (or vice versa) so that the scan line is substantially perpendicular to the optical code edges. Such operation requires some care on the part of the operator and reduces productivity. Furthermore, these devices are sensitive to label defects, as a single narrow scan line is typically used to detect light and dark area edges. To maximize the productivity of the operator and minimize the stresses on the operator due to repetitive motions, it is therefore desirable to read an optical code at any orientation relative to the optical code reader.

Existing optical code reader systems typically require an operator to handle each object bearing optical code (or handle a portable scanner) in order to orient the item to the reader for reading. A conveyor belt system may be used to reduce the amount of effort required. Nevertheless, a significant amount of manual effort is usually required. Existing systems generally do not allow scanning of all surfaces of the packages, requiring the operator to position the packages so that the optical code is on the surface to be read.

In addition to problems reading optical codes at random orientations, existing area imaging readers are limited in their Depth of Field (DOF), sometimes referred to as the working range. To accurately read objects marked with an optical code, the optical code must lie within a particular range of distance before the fixed focal lens distance. The particular range of distance before the fixed focal lens distance is known as the DOF. Thus, unless the entirety of the optical code lies within the shallow DOF of a convention optical code reader, most of the optical code image produced on the image sensor array is out of focus and is not accurately read.

The DOF of an optical code reading system varies as a function of, among other variables, focal distance and aperture setting. Typically, optical code readers suffer from a shallow DOF. This shallow DOF is due to the low levels of reflected light available to read an optical code, particularly in ambient light CCD optical code readers. Since low levels of light are available, the optical code reader system requires the use of large aperture settings. This large aperture setting in turn results in a shallow DOF. While a conventional omni-directional optical code reader may accurately read an optical code at the exact focal distance of the system, slight variations from this focal distance (i.e., outside the DOF) will result in out-of-focus and unsuccessful optical code reading.

The easiest method used to partially counteract this shortcoming is to raise the f-number of the optical system substantially. Unfortunately, when the f-number is increased the corresponding aperture size decreases. As a result the amount of light passed through the optical system decreases dramatically. This decreased light is particularly evident in an imaging-type optical code reader. The reduced available light level requires that the time for integration of the optical code image on the sensor must be increased, or extra illumination must be provided on the optical code, or both. If longer integration time is used, the sensitivity to image blur due to optical code image motion is increased. If extra illumination is required, then the cost, complexity, and power requirements of such a system are also increased.

In a preferred configuration, the image sensor plane is tilted with respect to the lens (or lens with respect to the image sensor plane) according to the Scheimpflug principle. By altering the angle between the image sensor plane and lens of the optical code reader, the DOF of the system can be increased without increasing the f-number. Accordingly, the aperture size is not decreased and adequate light is allowed through the system.

The configuration utilizes the increased DOF images derived from multiple image sensor arrays arranged in accordance with the Scheimpflug principle to allow for accurate reading of an optical code at a random orientation. Thus, to better understand the advantages of the Scheimpflug principle, we now turn to FIGS. 1–4.

Referring to FIG. 1, a conventional imaging system 101 is shown with a given aperture setting defined by aperture stop 110, where the lens plane 102 is parallel to the image plane 103. Additionally, the image sensor array, 113 is located at the image plane 103 at a particular distance, $D_i$ from the lens system. For an object 114, such as an optical code, which is located a distance $D_o$ from the lens system at object plane 104, the image is entirely in focus on the sensor array 113 according to first-order optics. Each object point, as represented by examples 117a and 117b, is conjugate to a corresponding image point, as represented by examples 118a and 118b. In these examples, 117a and 118a are conjugates, and 117b and 118b are also conjugates. If the optical code object 114 is moved away from object plane 104, then the image focus moves away from the image sensor 113 and the image on the sensor becomes blurred.

Figure 2:
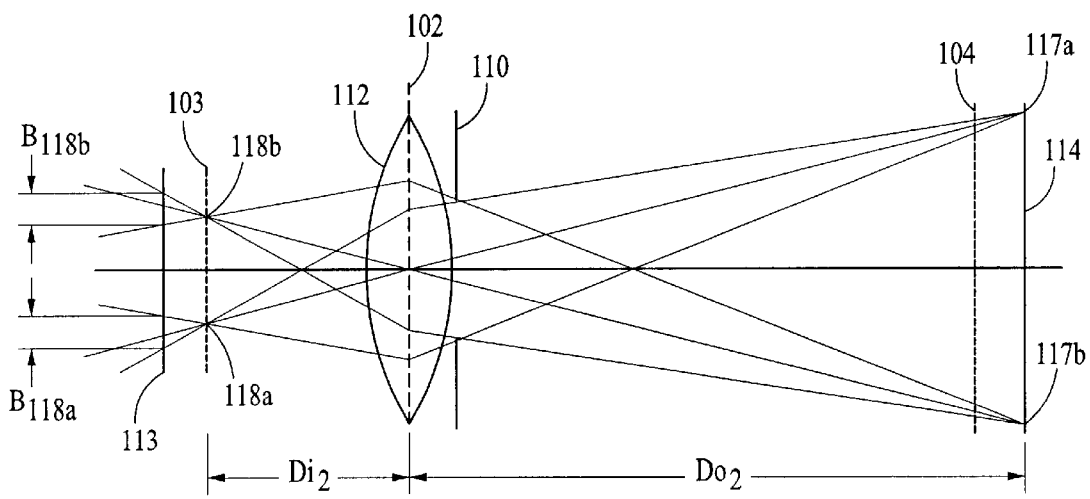
FIG. 2 is a diagram of a conventional imaging system illustrating a first out-of-focus condition.

FIG. 2 displays the case where the object 114 has been moved a greater distance $D_{o2}$ away from the lens system. This action moves the image plane 103 closer to the lens system 112 to a distance of $D_{i2}$. The image is in sharp focus at plane 103, but is blurred at the sensor 113. As an example, the light from the optical code point at 117b is conjugate with point 118b, and can be seen to converge to a sharp focus at 118b. As the light rays from 118b continue beyond the image plane 103, they form a blur circle of diameter $B_{118b}$ by the time they strike sensor 113. Similarly, as the light rays from object point 117a converge on conjugate image point 118a and then continue beyond the image plane 103, they form a blur circle of diameter $B_{118a}$ by the time they strike sensor 113.

Figure 3:
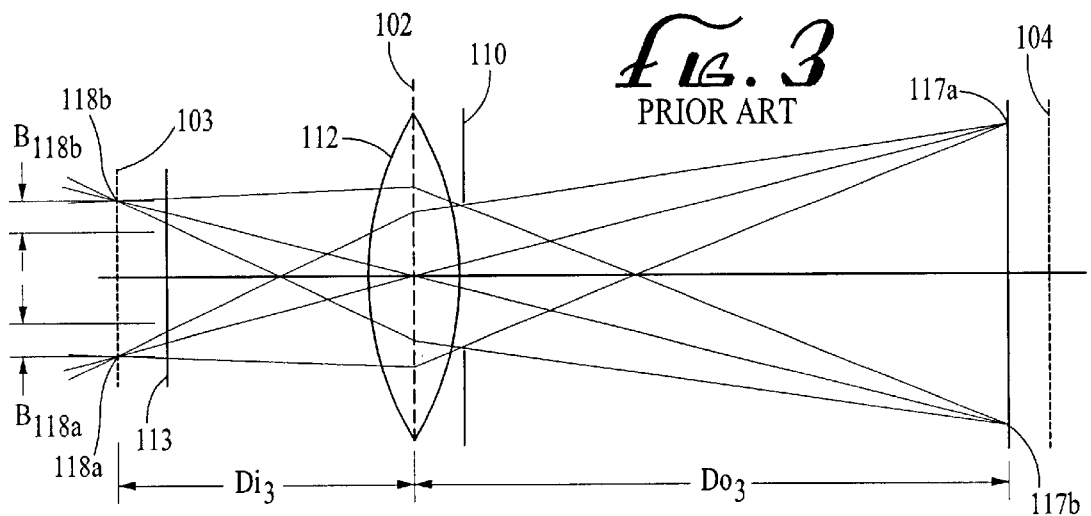
FIG. 3 is a diagram of a conventional imaging system illustrating a second out-of-focus condition.

FIG. 3 depicts the other out-of-focus condition, whereby the object 114 is moved to a distance $D_{o3}$, which is closer to lens system 112. In this case, the image plane 103 moves away from the lens 112, to a distance $D_{i3}$. In this case, the light from, for example, optical code object point 117a would converge to sharp focus at conjugate image point 118a except for the fact that it strikes image sensor 113 before reaching this point. As in the last case, a blur circle of diameter $B_{118a}$ is formed on the image sensor. At some point, the blur circles formed in the cases shown in FIGS. 2 and 3 grow just large enough as to make the image too defocused to be of use. It is the location of the object planes 104 in these two extreme cases that define the inner and outer limits of the depth-of-field of the system. This depth-of-field is dependent upon the f number of the system, which, for a given focal length lens, is just dependent upon the aperture stop 110. For a high f-number (small aperture) system the depth-of-field is greater than for a low f-number (large aperture) system. Unfortunately, although a large depth-of-field is desired for an optical code reading device, if the aperture is made smaller to achieve this goal, then the amount of light falling on the sensor, and thus the brightness of the image is greatly reduced.

Figure 4A:
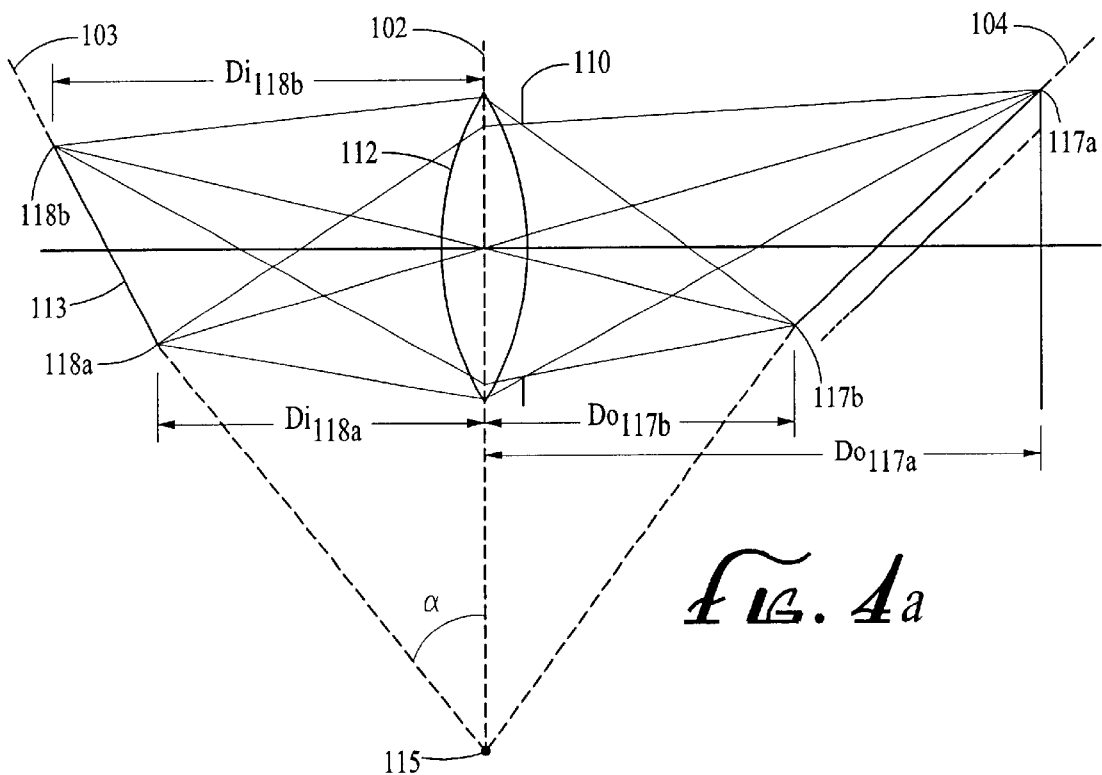
FIG. 4a is a diagram of an imaging system utilizing the Scheimpflug condition.

FIG. 4a shows a solution to the depth-of-field/image brightness tradeoff problem. By tilting the image sensor 113 in the image plane 103 by some angle α, the corresponding object plane 104 will also be tilted by an amount given by the well-known Scheimpflug condition. All points on the object plane 104 will be in focus on the image sensor 113. As shown in FIG. 4a, the image sensor array plane 103 has been tilted at an angle α with respect to the lens plane 102 such that the object plane 104, image sensor array plane 103 and lens plane 102 intersect at the Scheimpflug point 115. Depending on the relative orientation of the object plane 104, the angle α, measured between the image sensor plane 103 and lens plane 102, will vary. Preferably, the angle α may be greater than 0° but less than 90°. Alternatively, the angle α may be greater than 90° but less than 180°. By tilting the image sensor array plane 103 in accordance with the Scheimpflug principle such that the lens plane 102, sensor plane 103 and object plane 104 all intersect at point 115, the entirety of object plane 114 is within the DOF.

For example, object point 117a on plane 104 is conjugate to point 118a on plane 103 and thus in focus on sensor 113. For an optical code 114 which intersects the object plane 104 anywhere along its extent, the line of intersection formed between the optical code plane 114 and the object plane 104 will be in sharp focus on image sensor 113. The depth-of-field for this system is determined by the limits of the object plane 104 as measured along the optical axis. The inner DOF limit Do117b, the outer limit Do117a, and the total DOF of the system is the distance between these two points, usually measured along the object plane. This depth-of-field is not dependent upon the aperture of the system and thus the aperture may be opened fully, allowing maximum image brightness.

Alternatively, the lens plane 102 may be tilted relative to the sensor plane 103, and, once again, in accordance with the Scheimpflug principle the object plane 104, image sensor array plane 103, and lens plane 102 will intersect at the Scheimpflug point 115.

FIG. 4b illustrates the imaging system depicted in FIG. 4a as a three-dimensional depiction. FIG. 4b shows an imaging system utilizing a Scheimpflug arrangement for achieving large depths-of-field at low f-numbers for reading optical codes using a tilted imaging array. The array 413, is a two-dimensional array of photodetectors as is typically employed in a CCD, CMOS, or other imaging sensor. A few of the many rows of photodetectors that make up the array are labeled 415, 420, and 425. As can be seen from FIG. 4b, the imaging array 413 has been tilted in one direction about the optical axis 410. The tilt angle α, lens focal length, aperture setting, and imaging array resolution may be selected to obtain the desired characteristics of depth-of-field and scan line width at a certain distance from the lens system 412. When the imaging array 413 is tilted, the corresponding object plane 404 on the opposite side of the lens system 412 also tilts according to the Scheimpflug condition, whereby the sensor plane 403, the lens system plane 402, and the object plane 404 all intersect in a common line 405. With sufficient sensor tilt, the object plane will be substantially parallel to the optical axis. The shaded region 465 represents the projection of the image sensor 413 through the lens system 412 onto the object plane 404. As with a typical imaging system, points in image space which are closer to the lens will be projected farther from the lens in object space. Thus, the top end of the image sensor 484 corresponds or is conjugate to the bottom end of the projected image 494. Similarly, the bottom end of the sensor 485 is conjugate to sensor image 495. In the same manner, the line of photodetectors 415 corresponds to the image of this line 445 in front of the lens system. An optical code, such as 440 will be in focus on this line of photodetectors when it is in the position shown.

Figure 4C:
FIG. 4c is a representation of the relative areas of focus on an image sensor array in an imaging system utilizing Scheimpflug optics.

An image 417 of a linear optical code 440 in the position shown will typically look like that shown in FIG. 4c. The sharpest region of focus 430 is centered around the row of photodetectors that represents the line of intersection between the optical code plane and the projection of the image sensor 465. This row is 445 in FIG. 4b. Above and below this row of photodetectors, there are gradually increasing amounts of defocus, as shown in FIG. 4c. If the optical code is oriented as shown and generally normal to the optical axis 410, the depth of field realized will extend from sensor image end 494 to 495, which can be a large distance. The optical code will be typically oriented in the manner shown in order to utilize the most depth-of-field. The optical code 440 will not, typically, lie parallel to the object plane 404. As can be seen from the drawing, whichever part of the optical code that intersects object plane 404 will be imaged by the row of photodetectors that are conjugate to the line of intersection. Because there is some finite depth-of-field inherent in the lens system, there will typically be several rows of detectors in focus above and below the specific row conjugate to the line of intersection 445 between the optical code 440 and the projection of the sensor 465.

Figure 4D:
FIG. 4d is a representation of the relative areas of focus on an image sensor array in an imaging system utilizing Scheimpflug optics.

If the inherent depth-of-field of the lens system is sufficient, there may be enough photodetector rows in focus in order to image a "stacked" or two-dimensional optical code, as shown in FIG. 4d, where a 2-D code is shown next to a linear or 1-D code for reference. As in FIG. 4c a region 430 of sharpest focus will exist on the image sensor 413.

FIG. 5 illustrates a simplified view of the face of image sensor array 113. As shown in FIG. 5, image sensor array 113 is made up of a series of video sensing (or raster) lines 140. Each video sensing (or raster) line 140 is made up of smaller individual pixels 150 which are capable of sensing photons of light collected through lens 412. As shown in FIG. 5, portion 120 may be made up of more than one raster line 140 depending on the resolution or spacing of the raster lines 140 on the image sensor array 113. The video line 141 represents the video line corresponding to the line of the object that intersects the object plane 404. In the example depicted in FIG. 5, the focused image portion lies in the region 120, made up of video lines 141, 142 and 143.

Referring back to FIGS. 4b through 4d, in the case of 1D optical code reading (i.e., bar codes), a focused image of portion 430 of the optical code label is sufficient to fully read the optical code. In the event of 2D optical code reading, however, producing a focused image of only portion 430 may or may not be sufficient to fully read the optical code label on object 440. Furthermore, the data received on the portion of the image sensor array 113 above and below portion 430 may be totally out of focus and thus indiscernible. To store and process the out of focus data would be an inefficient use of processor and memory capabilities.

Typically, an object is thought to generate an optical image through a lens in image space. An alternative visualization of optical images and their corresponding objects will now be discussed with reference to FIGS. 6–14.

Conventional Scheimpflug optical system visualization considers an object 114 marked with an optical code located in object space. The object space is defined as the space in which a physical object 114 that is marked with an optical code exists. For purposes of interpreting FIGS. 6–8 and 11–12, we will refer to the area to the right of the lens as object space. The lens system 112 produces an image of the object 114 (and hence an image of the optical code marked upon it) in image space.

Figure 6A:
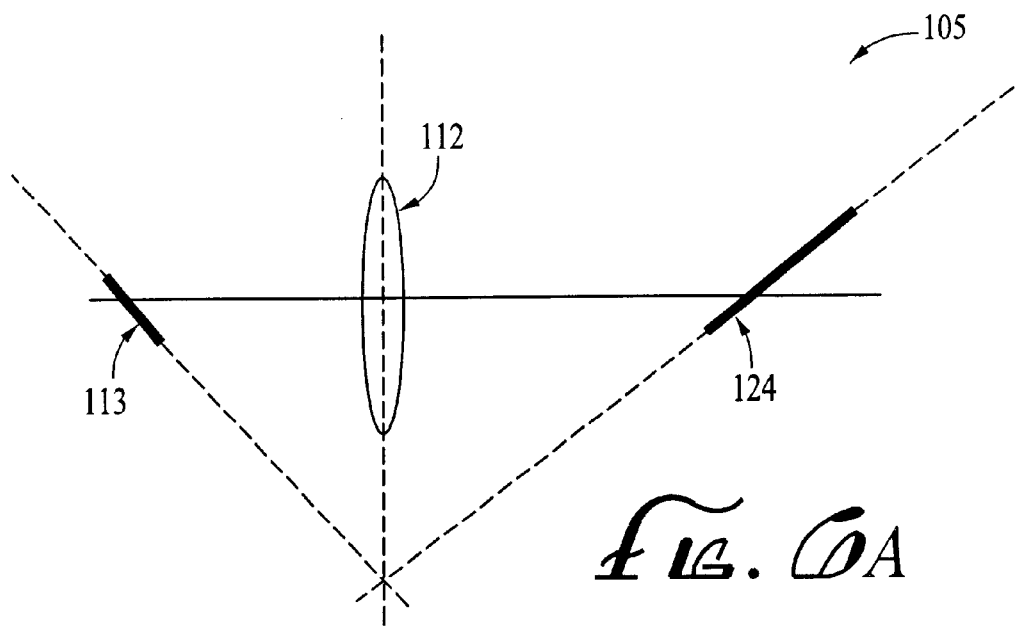
FIG. 6A is an abstract diagram illustrating an alternative visualization of an optical system utilizing the Scheimpflug principle.

The image space is defined as the space in which an image of a physical object 114 marked with an optical code is produced by a lens system 112. For purposes of interpreting FIGS. 6–8 and 11–12, we will refer to the area to the left of the lens as image space. FIG. 6A illustrates an alternative visualization of the optical system according to a preferred embodiment. Rather than visualizing the image an object produces in image space, FIG. 6 considers an image of an image sensor array projected into object space. Put another way, an image sensor array is a physical object upon which an image through a lens may be produced. However, an "image" of the image sensor array may be projected to the other side of the lens (i.e., object space).

In FIG. 6A, an optical system produces a projected image 124 of an image sensor array 113 through a lens system 112 in object space. The projected image 124 represents the area in object space where an object 114 (not shown) may be positioned to produce a well focused image of the optical code marked on object 114 through lens system 112 onto an image sensor array 113. In other words, prior to the introduction of an optical code label on object 114 to an optical system 101, an image sensor array creates a projected image 124 of itself in object space. By placing an optical code on an object 114 in the area defined by the projected image 124, a well focused image of the optical code on object 114 will be produced on the image sensor array 113. Additionally, due to the positioning of the image sensor array 113 at an angle with respect to the lens system 112, the projected image 124 is located such that a large DOF is created. Put another way, the projected image 124 covers a large horizontal distance. The horizontal distance that the projected image 124 covers is indicative of the DOF of the optical system 101. A dashed line is shown in FIGS. 6–8 and 11–12 to depict corresponding center points through the lens and extending through both object and image space. Such alternative visualization will be further discussed below.

Difficulty in obtaining proper optical code orientation is a result of image sensor array 113 construction and operation. As disclosed above, FIG. 5 illustrates a simplified view of the face of image sensor array 113. As shown in FIG. 5, an image sensor array 113 is made up of a series of light sensing (video or raster) lines 140. These lines may be oriented in either a horizontal or vertical direction. In FIG. 5, the video lines 140 are depicted in a horizontal direction. Each horizontal video sensing (or raster) line 140 is made up of smaller individual pixels 150 which are capable of sensing photons of light collected through lens 112. However, generating an entire 2-D image of the object 114 marked with an optical code produces an extremely large amount of data. Additionally, for a variety of reasons much of the data on the array 113 is out of focus and thus unusable. For this reason, much of the data from a 2-D image generated over the entire surface of the image sensor array 113 cannot be relied upon to be usable. For a video line 140 to produce valuable optical code data it must contain complete information. Therefore, each video line 140 must be properly oriented to the optical code to produce an image of an entirely usable portion of the optical code. This portion must be large enough to be used by the downstream decoding system. The optimum portion would be a line of data containing the entire optical code information, however smaller pieces may be "stitched" together by certain types of decoding systems.

For the image sensor array 113 to be properly oriented to read an optical code, such as a bar code symbol, the video lines 140 should be positioned in a direction substantially perpendicular to the direction of the bars in the optical code. Considering, as an example, a simple 1-D bar code, information is encoded as a series of vertically oriented bars of varying widths. Each bar of varying width represents a piece of encoded data. In order to read all of the data encoded on the optical code label, sufficient video lines equivalent to line 140 must collect data across the entire horizontal axis of the optical code label, either all in one line, or in sufficiently usable pieces. Therefore, to be properly oriented to the bar code, the image produced on a video line 140 must contain light collected across a sufficient section of the bar code. In other words, the orientation of the video line 140 should be substantially perpendicular to the direction of the bars in a bar code.

The series of video lines 140 on an image sensor array 113 creates a raster pattern. Because the orientation of the raster pattern for the image sensor array 113 is horizontal, the bars of the optical code must be oriented in a direction substantially vertical with respect to the raster pattern. As such, manual manipulation of the optical code label with respect to the optical code reader is typically required to position the raster pattern substantially perpendicular to the optical code label.

The amount of perpendicular alignment depends on the vertical extent of the optical code's edges and the size of the sections that may be successfully "stitched" or merged together by the decoding system. Put another way, the amount of orientation manipulation of the raster pattern depends on the actual dimensions of the optical code label and the stitching capabilities of the decoding system. For example, an "oversquare" optical code label (i.e. an optical code label that has a height dimension slightly greater than the width dimension of the smallest usable piece, which is often half of the entire label) may be rotated up to 45 degrees from its vertical alignment and still be accurately read by a horizontal raster pattern. An oversquare optical code label oriented in a direction rotated up to 45 degrees from vertical will still permit at least one horizontal video line 140 of the raster pattern to register a complete cross section of the optical code (i.e. corner-to-corner) usable piece. However in most optical code applications, so called oversquare optical code labels are not used. Truncated optical code labels are more commonly used to conserve space. Truncated optical code labels are labels that are shorter in their vertical bar dimension than their horizontal dimension. Use of truncated optical code requires a greater degree of proper orientation with the optical code reader. As a truncated optical code label is rotated beyond a predetermined angle, horizontal video lines 140 are no longer able to produce complete cross sectional images of the truncated optical code label usable pieces. As truncated optical code labels become shorter, the angle of rotation permitted for proper orientation is reduced. Therefore, to properly read a randomly oriented truncated optical code label additional raster patterns that are themselves rotated with respect to one another must be added. As additional raster patterns are added to the optical code reader system, the probability that the orientation of an added raster pattern is substantially perpendicular to the orientation of the optical code increases. Therefore, in a preferred system, multiple image sensor arrays 113 are provided, each arranged at an angle with respect to lens system 112 in accordance with the Scheimpflug principle. Additionally, the system 105 provides additional image sensor arrays 113, where the orientation of each additional image sensor array 113 is rotated with respect to each of the other image sensor array 113. In this manner the overall DOF of the optical code reader is increased. In addition, the capability of reading randomly oriented optical code labels is enhanced.

Figure 6B:
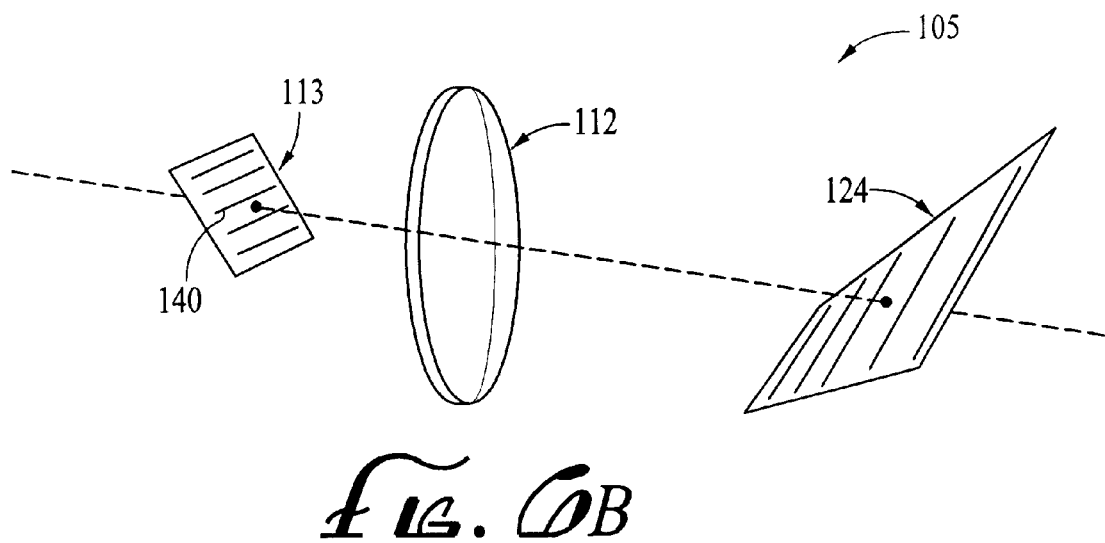
FIG. 6B is an abstract diagram illustrating a three dimensional view of the optical system visualization depicted in FIG. 6A.

FIG. 6B illustrates a three dimensional view of the optical system 105 shown in FIG. 6A. As shown in FIG. 6B, an image sensor array 113 is positioned at an angle with respect to lens system 112 in accordance with the Scheimpflug principle. Additionally, FIG. 6B shows a horizontal raster pattern of video lines 140 appearing on image sensor array 113. Image sensor array 113 produces a projected image 124 through lens system 112 in object space. The projected image 124 of image sensor array 113 is oriented to read optical code labels oriented in a substantially vertical direction. Again, the amount of substantial vertical orientation depends on the dimensions of the optical code label.

Figure 7:
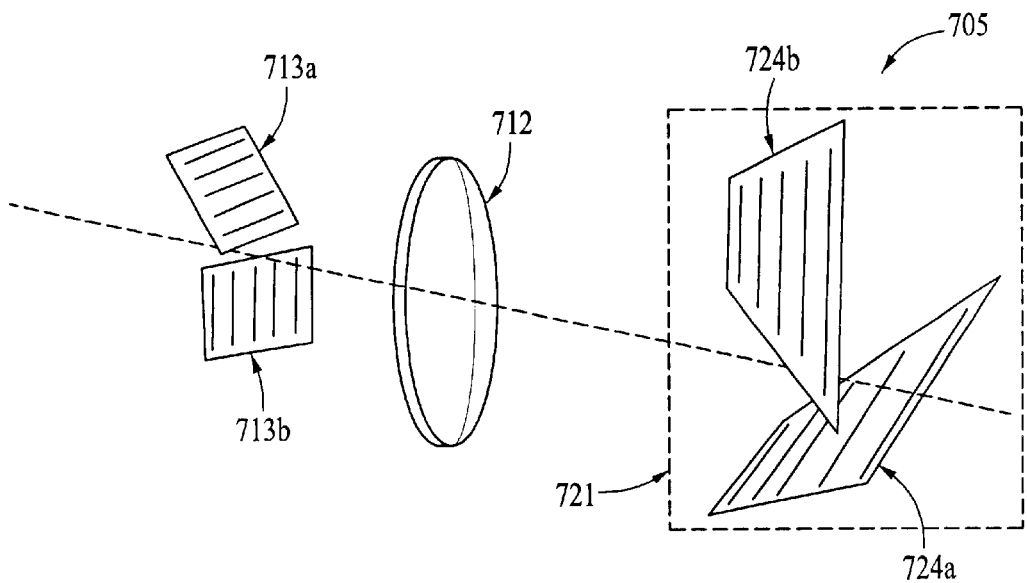
FIG. 7 is an abstract diagram of a simple optical code reader in accordance with one configuration using the visualization depicted in FIGS. 6A and 6B, illustrating a simple orthogonal line optical code reader using two orthogonal tilted image sensor arrays.

FIG. 7 illustrates an optical code reader 705 having two image sensor arrays 713a and 713b. Each image sensor array 713a and 713b is arranged at an angle with respect to lens system 712 in accordance with the Scheimpflug principle so that the DOF of each image sensor array 713a, 713b is improved. Additionally, each image sensor array 613a and 613b is rotated such that the raster patterns of each are orthogonal to one another. Thus, each image sensor array (713a and 713b) produces respective projected images 724a and 724b in object space. These projected images 724a and 724b represent not only the region in object space where an object 114 (not visible in FIG. 7, but shown in FIGS. 1–4) will produce a well-focused image, but also represent the relative orientation of an object 114 marked with an optical code which may be positioned at and still be accurately read. Thus, while the actual location and position of an object 114 to be read is not known, so long as object 114 is located and positioned in the space designated by projected images 724a and 724b, optical code reader 705 will be able to accurately read the optical code.

Two sensors, image sensor array 713a oriented in a horizontal direction and image sensor array 713b oriented in a vertical direction, are arranged about the axis of a lens system 712. The image sensor arrays 713a and 713b are rotated in such a way as to create projected images 724a in a horizontal orientation and projected image 724b in a vertical orientation in object space. The two sensors taken together create a sizable scan zone 721. Scan zone 721 represents the region in object space where an object 114 marked with an optical code may be positioned and produce a well-focused image in image space. Thus, an object 114 marked with an optical code label in a substantially vertical orientation positioned within projected image 724a will produce a well-focused, properly read image of the optical code. Alternatively, the optical code reader 705 may also provide a well-focused properly-read image of the optical code marked on an object 114 marked with an optical code label in a substantially horizontal orientation positioned within projected image 724b.

Figure 8:
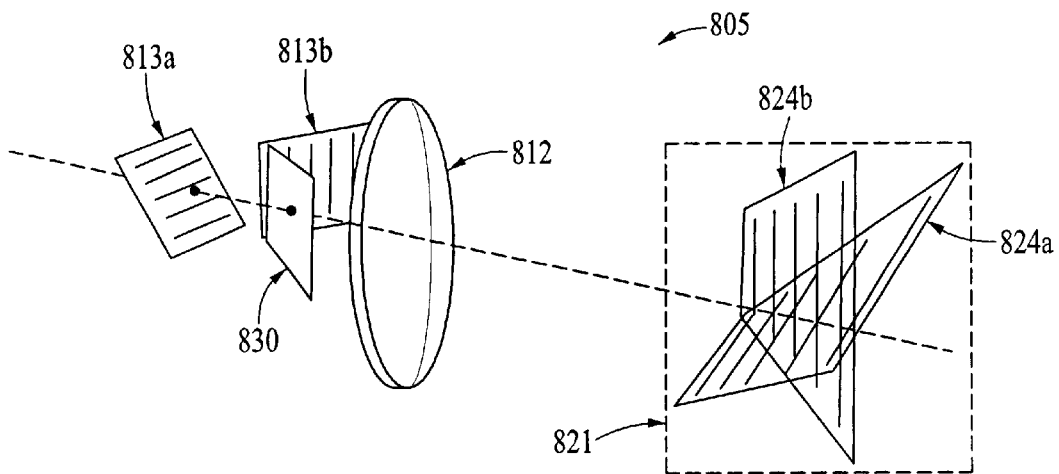
FIG. 8 is another abstract diagram of a simple optical code reader in accordance with the configuration illustrated in FIG. 7, illustrating an orthogonal line optical code reader with a compacted scan zone using a beam splitter.

FIG. 8 shows a second possible configuration of an optical code reader 805 similar to the reader 705 shown in FIG. 7. In contrast to the first configuration, the optical code reader 805 includes a beam splitter 830, so that two projected images may overlap and create a more compact scan zone 821. In this configuration, the image of the horizontal image sensor array 813a is created by the direct optical path from the image sensor array 813a, through the partially transmissive beam splitter 830 and lens system 812 to the projected horizontal sensor image 824a. The vertically oriented image sensor array 824b produces an image from rays of light following the optical path that involves a reflection from the beam splitter 830, through the lens system 812, to the projected image of the vertical sensor 824b. This construction allows for a more compact scan zone 821, which is typically easier for an operator to use. Thus, an object (positioned in object space) marked with an optical code label with either a substantially vertical or horizontal orientation positioned within scan zone 821 will produce a well-focused, fully-read image of the object 814 (not shown) marked with the optical code label on the image sensors 813a, 813b in image space.

In either the optical code reader 705 depicted in FIG. 7 or the optical code reader 805 depicted in FIG. 8, an object marked with an optical code label oriented substantially in either the vertical direction or the horizontal direction, positioned in object space, may be read. Additionally, for "oversquare" optical codes, any object marked with an optical code label rotated up to 45 degrees from either the horizontal or vertical axis and located within the scan zone 821, may be read. Thus, for an object marked with an "oversquare" optical code label, the optical code label oriented in virtually any direction may be read. In the more common truncated optical code situation however, two imaging sensors orthogonal to one another will increase the possible orientation directions that may be read but will not allow for omni-directional reading.

Figure 9:
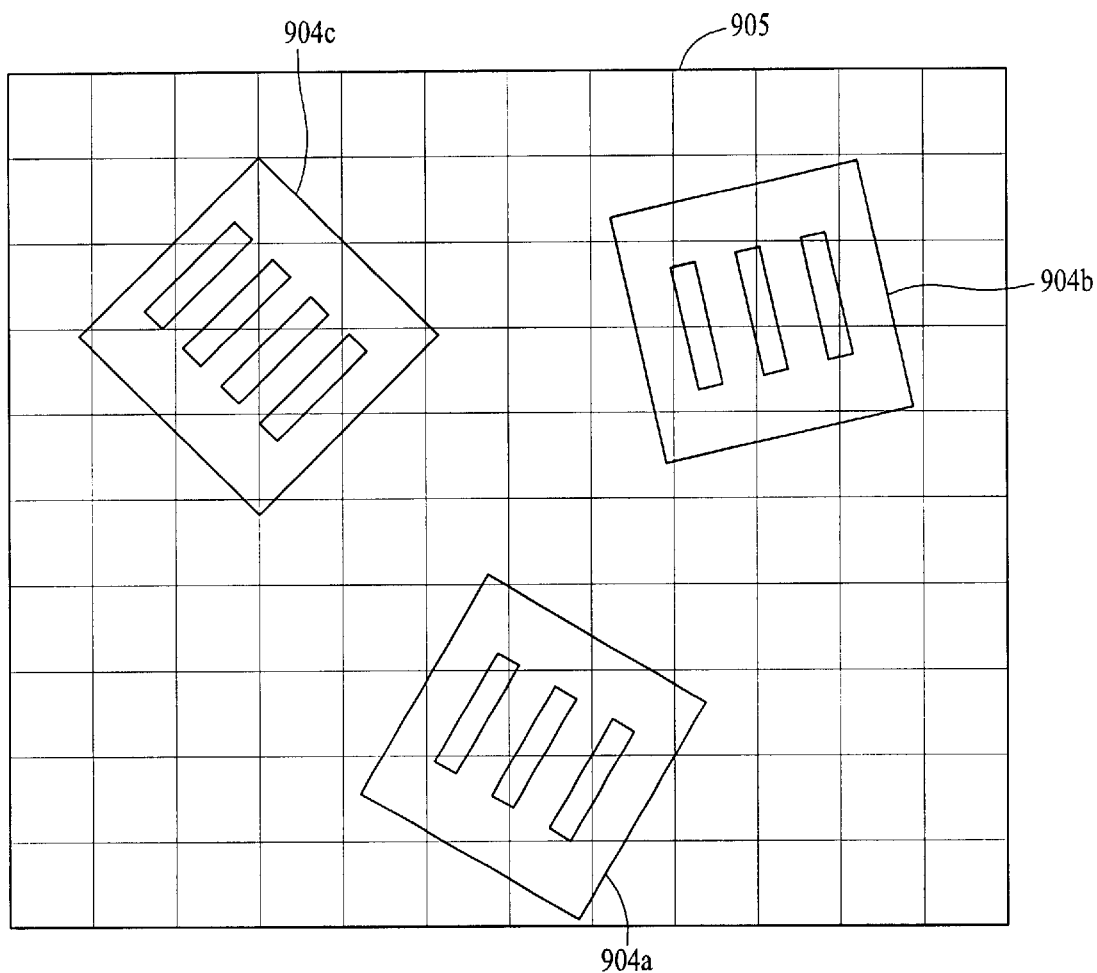
FIG. 9 is a simplified diagram illustrating a sample-scan line raster pattern created by two imaging sensors oriented orthogonal to one another and the outlines of oversquare optical code labels oriented in various directions.

FIG. 9 shows the sample-scan line raster pattern 905 created by the two imaging sensors orthogonal to one another. The sample-scan line pattern in FIG. 9 depicts the projected raster line pattern 905 occurring in scan zone 821. In other words, FIG. 9 depicts a frontal view of the projected images 824a and 824b overlaid on each other. This frontal view of the combined projected image produces a sample-scan line pattern 905 depicted in FIG. 9. FIG. 9 also shows several outlines of sample oversquare optical codes pieces 904a, 904b, 904c. Each outline 904a, 904b, 904c, is positioned at a different orientation. As shown in FIG. 9, the "oversquare" optical code label (904a, 904b, 904c) may be rotated in any direction and still be read by at least one of the imaging sensor arrays (i.e., 713a and 713b or 813a and 813b). At least one scan line of each raster patterns will completely read the optical code label at a random orientation.

Figure 10:
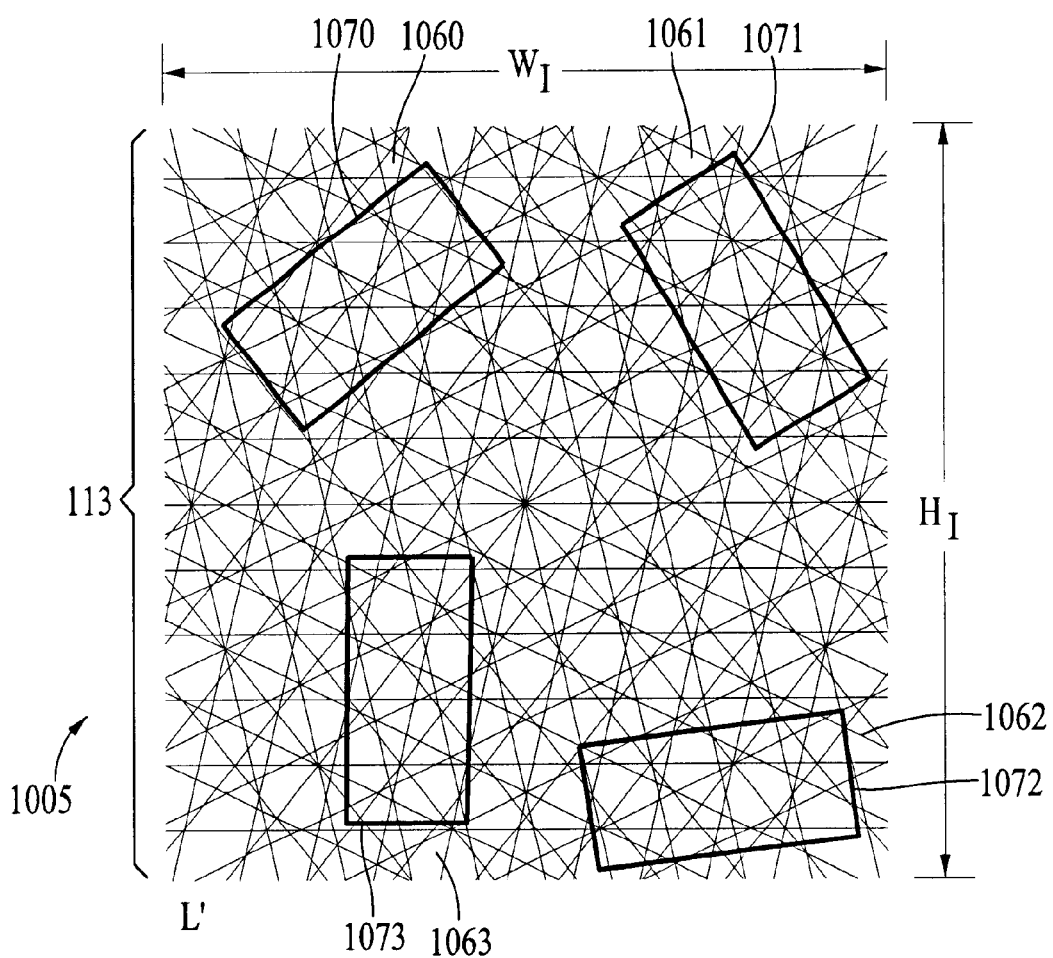
FIG. 10 is a detailed diagram illustrating a sample scanning pattern superimposed with the outlines of projected optical code label images at various orientations.

FIG. 10 shows a more complex sample-scan line pattern similar to that shown in FIG. 9 that allows for omni-directional reading of truncated optical codes. Outlines of truncated optical codes (1070, 1071, 1072, 1073) at various orientations are shown in FIG. 10. The sample-scan line raster pattern 1005 shown in FIG. 10 is produced by multiple image sensor arrays 113, each image sensor array slightly rotated with respect to one another about a shared axis which runs through the center of each image sensor array 113. The image sensor arrays 113 may be rotated in either a clockwise or counterclockwise direction, so long as an approximately equal amount of rotation exists between each successive image sensor array 113.

As shown in FIG. 10, at least one raster pattern video line 140 (see FIG. 5) is able to completely read an entire cross section of an optical code label piece at a random orientation. For example, raster scan line 1060 is able to completely read optical code label 1070. Raster scan line 1061 is able to completely read optical code label 1071. Raster scan line 1062 is able to completely read optical code label 1072. Raster scan line 1063 is able to completely read optical code label 1073. Accordingly, providing the first and second configurations with additional imaging sensor arrays such that the orientation of the video lines 140 of each additional imaging sensor is at an offset angle results in a sample-scan pattern as shown in FIG. 10. A third configuration also provides additional beam splitters to promote a compact scan zone while increasing the number of readable optical code orientations.

In order to allow for omni-directional reading of truncated optical codes, additional raster patterns may be added to produce more complex sample-scan patterns as shown, for example, in FIG. 10. To produce the additional raster patterns, additional image sensor arrays 113 are provided. As each image sensor array 113 is added to the optical code reader, the omni-directional reading capability also increases. To produce a sample-scan line pattern capable of omni-directional reading, N number of image sensor arrays are provided. Each of the plurality of image sensor arrays is oriented in a direction 180/N degree out of phase from one another.

Figure 11:
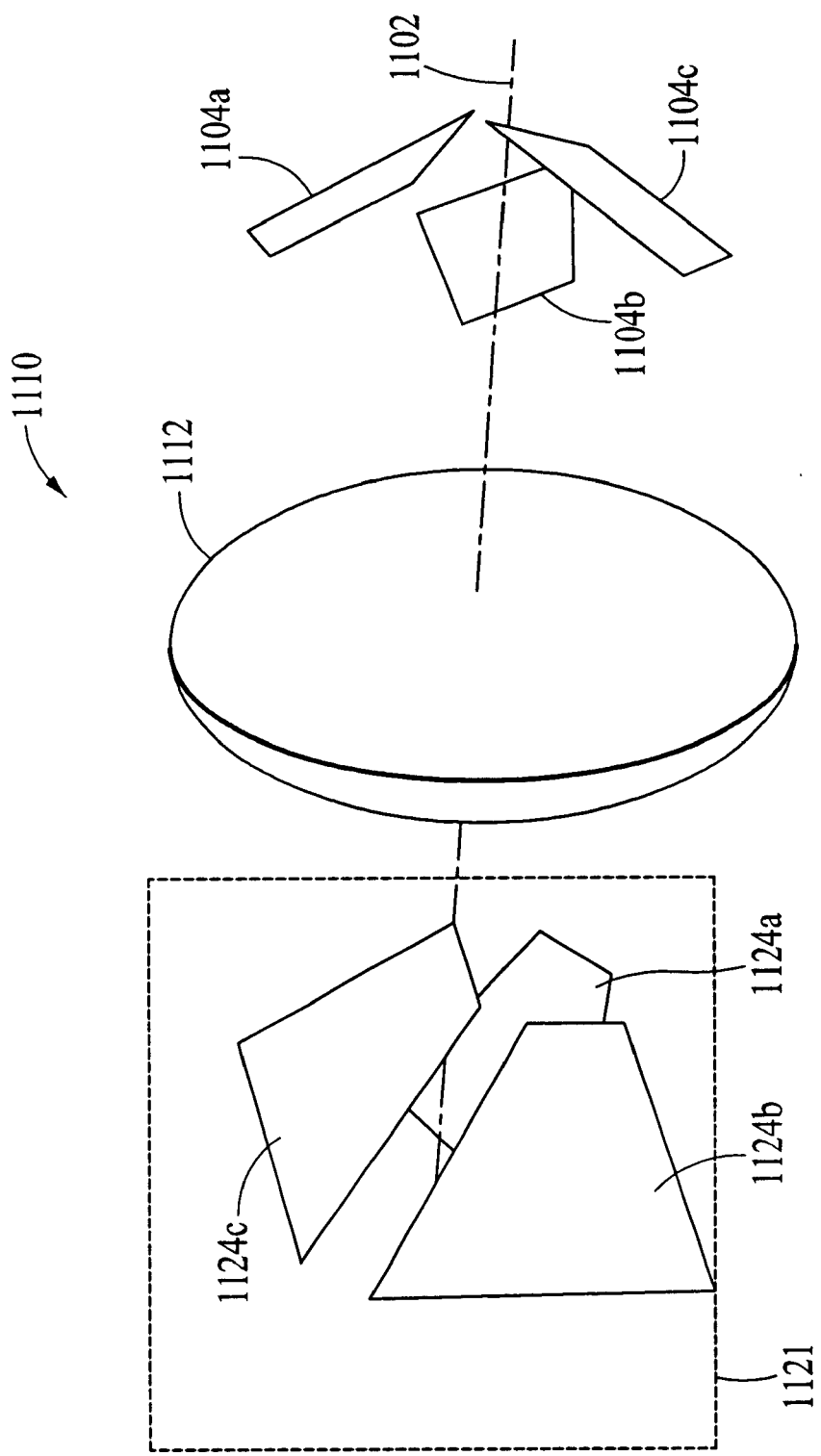
FIG. 11 is a detailed abstract diagram of one configuration illustrating an optical code reader with multiple sensor arrays tilted at an angle in accordance with the Scheimpflug principle using the same alternative visualization depicted in FIGS. 6–8.

FIG. 11 illustrates an optical code reader 1110 with a number of photodetector sensor arrays, which may be expanded to N arrays. FIG. 11 shows a lens system 1112 that produces projected images 1124a, 1124b, and 1124c of image sensor arrays 1113a, 1113b, and 1113c in a compact scan zone 1121. The compact scan zone 1121 may contain projected images of N-number of image sensor arrays. An object positioned within scan zone 1121 will produce a well-focused image onto the N-number of image sensor arrays 1113. A sample-scan line pattern is defined based on the dimensions of the optical code to be scanned. The pattern is preferably determined so that a minimum number of scan line directions are utilized to provide omni-directional optical code reading. A sample-scan line pattern capable of reading a truncated optical code label at any orientation is shown in FIG. 10.

Additionally, each of these sensors 1113a, 1113b, 1113c includes a tilt mount setting to set each of the additional imaging sensors at an angle in accordance with the Scheimpflug principle. Such angle setting for each image sensor array provides a preferred DOF for each sensor.

Figure 12:
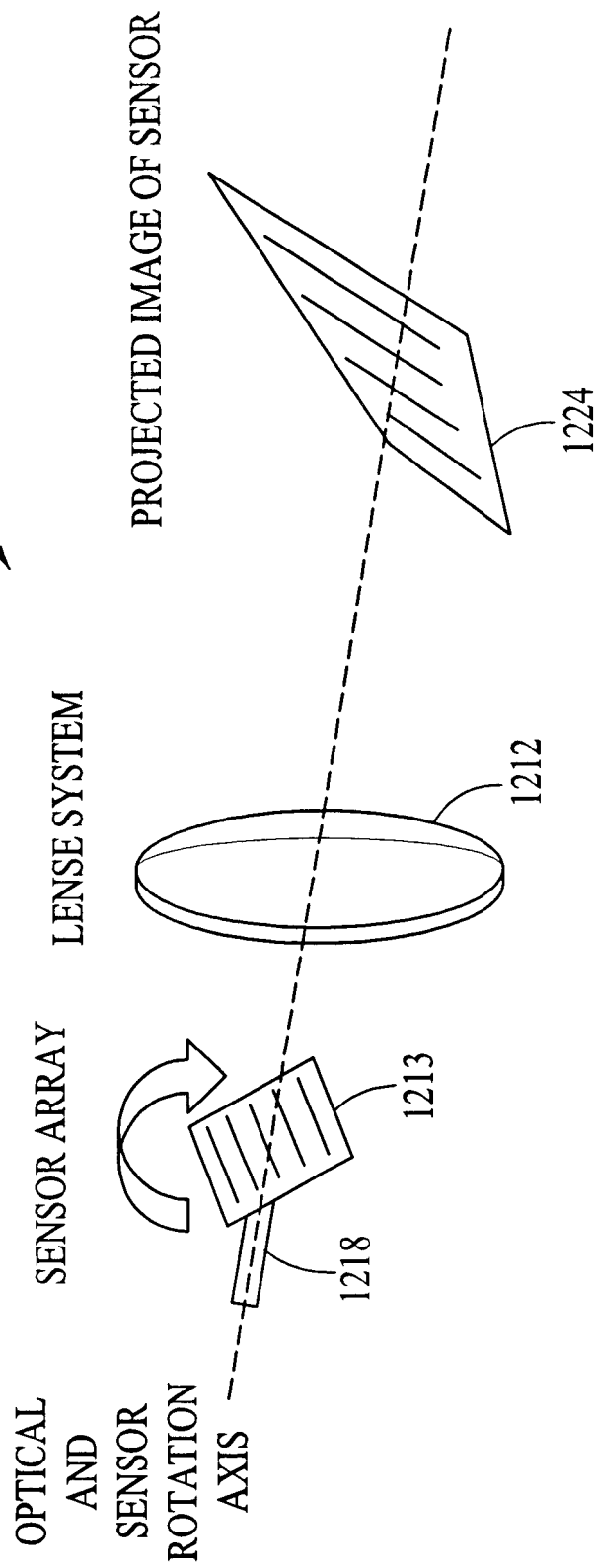
FIG. 12 is a diagram of another configuration illustrating an optical code reader with a rotatable sensor array tilted at an angle in accordance with the Scheimpflug principle using the same alternative visualization depicted in FIGS. 6–8 and 11.

By tilting an image sensor array 1113 in accordance with the Scheimpflug principle, the optical code reader provides a preferred DOF to read optical codes oriented in the same direction of the imaging sensor array. By rotating a single tilted image sensor array 113 in synchronicity with the timing of the raster scan, a single imaging sensor array may produce the sample-scan pattern depicted in FIG. 10. FIG. 12 illustrates an optical code reader with a rotatable sensor array.

FIG. 12 illustrates an optical code reader 1215 including a rotatable mounting 1218 for the imaging sensor array 1213. The image sensor array 1213 is mounted on mounting 1218 at an angle with respect to the lens system 1212 in accordance with the Scheimpflug principle. The rotational speed of the mounting 1218 may be synchronized with the time between successive imaging cycles of the image sensor array 1213. This synchronization produces an angular rotation such that the mounting 1218 rotates a predetermined angular distance between imaging cycles. An image cycle being defined as the time it takes image sensor array 1213 to reset before new image data is collected representing an image of an object marked with an optical code label. In doing so, each video line 140 produces image data of object in an orientation indicative of the orientation of each scan line appearing in a sample-scan line pattern. The reader 1215 provides an improved DOF by arranging the image sensor array 1213 at an angle in accordance with the Scheimpflug principle. In addition, the rotation of the image sensor array 1213 through the rotatable mount 1218 produces projected image 1224 that rotates as well. The rotation and repeated image sampling of image sensor 1213 produces a sample-scan line pattern capable of omni-directional optical code reading. Adjusting the rotational speed of the mount 1218 alters the sample-scan line pattern.

For example, by setting the angular rotation speed such that the mount 1218 (and subsequently the image sensor array 1213) rotates 90 degrees in an image cycle, the sample-scan line pattern depicted in FIG. 9 is produced. Alternatively, by decreasing the angular distance traveled during the imaging cycle, a sample-scan line pattern depicted in FIG. 10 can be produced. Depending upon optical code label characteristics, an appropriate sample-scan line pattern capable of omni-directional optical code reading may be produced by altering the rotation speed.

Figure 13:
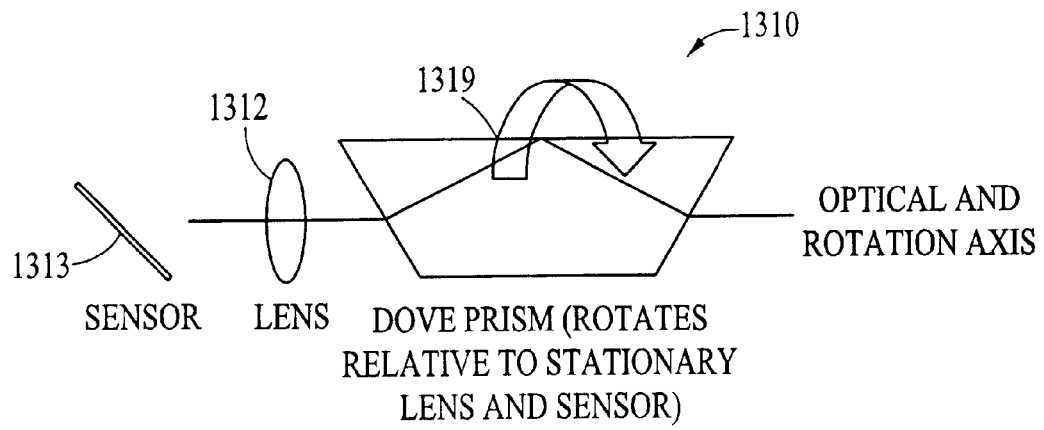
FIG. 13 is a diagram of still another configuration illustrating an optical code reader with a rotatable optical device and sensor array tilted at an angle in accordance with the Scheimpflug principle using the same alternative visualization depicted in FIGS. 6–8 and 11–12.

Alternatively, this alternative embodiment may include an image sensor array 113 which may be mounted in a stationary position, but also includes an optical device that rotates the rays of light making up the image of an object 114 marked with an optical code. In this manner the actual image received through a lens system 112 and subsequently imaged onto an image sensor array 113 is rotated. Several optical devices are available to rotate the rays of light making up an image. FIG. 13 illustrates an optical system 1310 including an example of such an optical device. The optical system 1310 includes an image sensor array 1313 positioned at an angle with respect to lens system 1312 in accordance with the Scheimpflug principle and a dove prism 1319 positioned before the lens system 1312. The dove prism may be positioned either in object space or image space, FIG. 13 depicting the dove beam splitter 1319 in object space. A dove prism 1319 rotates relative to a stationary lens system 1312 and image sensor array 1313. Using such an optical device the actual rays of light making up an image of an object are rotated. This rotation of light rays causes the image of the object, positioned in object space, marked with an optical code to be rotated as it is projected onto the image sensor array 1313. The rotation of the projected image may be synchronized with the imaging cycle of the image sensor array 1313. In this manner a sample-scan line pattern is produced capable of omni-directional reading.

Figure 14:
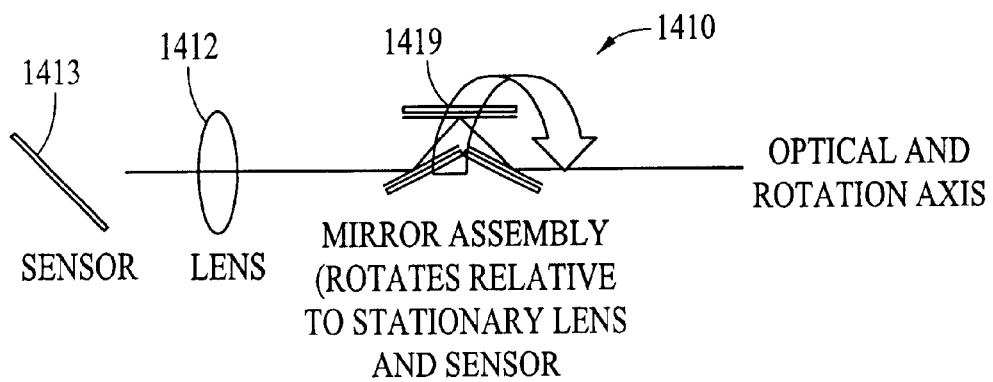
FIG. 14 is a diagram of still another configuration illustrating another optical code reader with a rotatable optical device and sensor array tilted at an angle in accordance with the Scheimpflug principle using the same alternative visualization depicted in FIGS. 6–8 and 11–12.

FIG. 14 illustrates a system 1410 similar to the device shown in FIG. 13. The system 1410 includes an image sensor array 1413 positioned at an angle with respect to lens system 1412 in accordance with the Scheimpflug principle. The system 1410 may also include, for example, a mirror assembly 1419 positioned before the lens system 1412 either in object space or image space. FIG. 14 depicts the mirror assembly 1419 in object space. As with other embodiments, the mirror assembly 1419 rotates. The rotational speed may be also synchronized with the imaging cycle of image sensor array 1413. Again, by adjusting the rotational speed of the dove prism 1319 in FIG. 13 or the mirror assembly 1419 in FIG. 14, variable sample-scan line patterns may be produced capable of omni-directional optical code reading. The exact sample-scan line pattern (and rotational speed) will depend upon optical code label characteristics.

Figure 15:
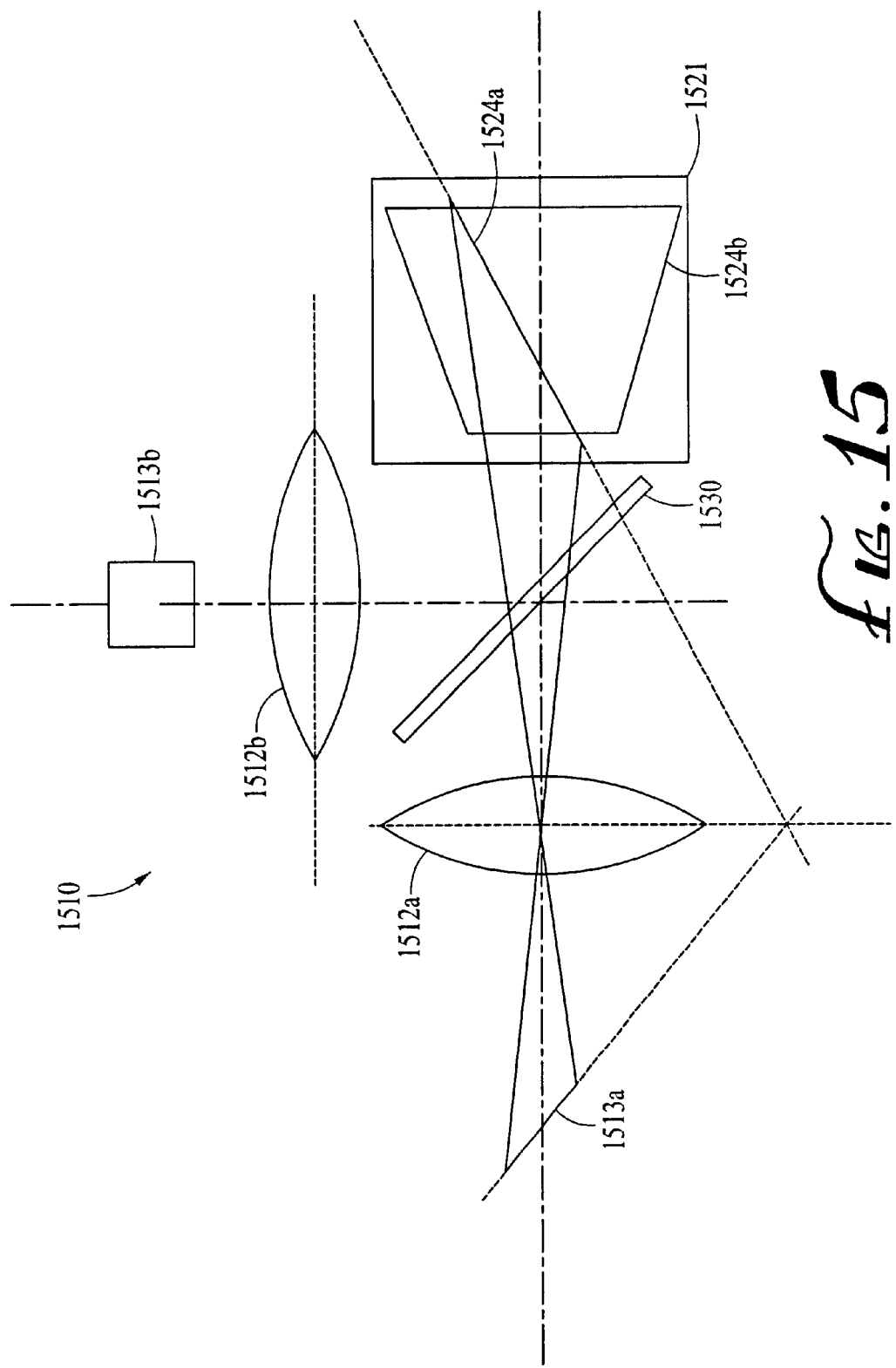
FIG. 15 is an alternative arrangement to FIG. 8, wherein each sensor has its own lens system and shares a common beam splitter which is in the object space side of the lens systems.

FIG. 15 depicts a system 1510 employing an alternative use of a beam splitter to create a two-orthogonal plane scanner for omni-directional reading of oversquare optical codes, similar to FIG. 8. In this embodiment, however, each imaging sensor 1513a and 1513b has its own associated lens system, 1512a and 1512b, and a beam splitter, 1530 is placed in the object space side of the lenses. The substantially orthogonal scan planes 1524a and 1524b are thus created within a compact overlapping scan zone 1521.

While the above description contains much specific detailed information, these details should not be construed as limitations on the scope of the invention, but rather as an exemplification of preferred configurations thereof. Other variations are possible. Accordingly, the scope of the present invention should be determined not by the embodiments illustrated above, but by the appended claims and their legal equivalents.

What is claimed is:

1. An omni-directional optical code reader comprising:
    a lens system;
    a first image sensor array for detecting a signal representative of light reflected from an optical code through said lens system, wherein the first image sensor array is disposed approximately at a tilt angle α with respect to the lens system;
    a second image sensor array for detecting a signal representative of light reflected from an optical code through said lens system, wherein the second image sensor array is disposed approximately at the tilt angle α with respect to the lens system and oriented in a direction substantially orthogonal to said first image sensor array; and
    a first beam splitter to provide a reflected image of the optical code to the first image sensor array and a transmissive image of the optical code to the second image sensor array.

2. An omni-directional optical code reader comprising:
    a lens system;
    N image sensor arrays for detecting a signal representative of light reflected from an optical code through said lens system, wherein each of said N image sensor arrays is disposed at approximately the same tilt angle α with respect to the lens system, each of said N image sensor arrays oriented in a direction approximately 180/N degrees in relation to one another, N being an integer greater than 1.

3. An omni-directional optical code reader comprising:
    a lens system having an optical axis;
    an image sensor array for generating a pattern of analog signal lines representative of light reflected from an optical code through said lens system, wherein the image sensor array is disposed at a tilt angle α with respect to the lens system and wherein the image sensor array is rotatable about the optical axis while maintaining the tilt angle α to produce an omni-directional sample-scan line pattern.

4. The omni-directional optical code reader of claim 3, wherein rotation of the image sensor array is synchronized with a timing cycle of raster scan line reading of the image sensor array.

5. An omni-directional optical code reader comprising:
    a lens system;
    an image sensor array for detecting a signal representative of light reflected from an optical code through said lens system, wherein the image sensor array is disposed at a tilt angle α with respect to the lens system; and
    an optical device for rotating the image of the optical code.

6. The omni-directional optical code reader of claim 5, wherein rotation of the image of the optical code is synchronized with a timing cycle of raster scan line reading of the I-mage sensor array.

7. The omni-directional optical code reader of claim 5 wherein the optical device is a dove prism.

8. The omni-directional optical code reader of claim 5, wherein the optical device is a mirror assembly.

9. An omni-directional optical code reader comprising:
    a first lens system;
    a first image sensor array for detecting a signal representative of light reflected from an optical code through said first lens system, wherein the first image sensor array is disposed approximately at a tilt angle α with respect to the first lens system;
    a second lens system;
    a second image sensor array for detecting a signal representative of light reflected from an optical code through said second lens system, wherein the second image sensor array is disposed approximately at the tilt angle with respect to the second lens system and oriented in a direction substantially orthogonal to said first image sensor array; and
    a beam splitter to provide a reflected image of the optical code to the first lens system and image sensor array and a transmissive image of the optical code to the second lens system and image sensor array.

10. A method of optical reading comprising the steps of focusing an image with a lens system along an optical axis toward an image sensor array;
    arranging the image sensor array at a tilt angle α with respect to the lens system according to Scheimpflug principle;
    rotating the image sensor array about the optical axis while maintaining the tilt angle α;
    generating a pattern of analog signal lines representative of light reflected from an object being read through said lens system.

11. A method according to claim 10 wherein the image sensor array comprises a two-dimensional array.

12. A method according to claim 11 further comprising rotating the image sensor array in synchronicity with timing of raster scan line reading of the image sensor array.

13. A method according to claim 10 further comprising
synchronizing rotational speed of the image sensor array with time between successive imaging cycles of the image sensor array.

14. A method of optical reading comprising the steps of
receiving an image from an object to be read;
directing the image so as to direct the image toward a first lens system and to direct the image toward a second lens system;
focusing the image with the first lens system onto a first sensor array, the first sensor array being arranged at a tilt angle with respect to the first lens system according to Scheimpflug principle;
focusing the image with the second lens system onto a second sensor array, the second sensor array being arranged at a tilt angle with respect to the second lens system according to Scheimpflug principle.

15. A method according to claim 14 wherein the step of directing the image comprises splitting the image for simultaneously directing the image toward the first lens system and the second lens system.

16. A method according to claim 15 wherein the step of splitting the image comprises splitting the image via a beam splitter.

17. A method according to claim 14 further comprising arranging an image plane of the first sensor array orthogonal to an image plane of the seocond sensor array.

* * * * *

UNITED STATES PATENT AND TRADEMARK OFFICE
CERTIFICATE OF CORRECTION

PATENT NO. : 6,621,063 B2
APPLICATION NO. : 09/884975
DATED : September 16, 2003
INVENTOR(S) : Alexander M. McQueen It is certified that error appears in the above-identified patent and that said Letters Patent is hereby corrected as shown below:

<u>Column 5,</u>
line 2, "f number" should read --f-number--.

<u>Column 14,</u>
line 26, claim 6, "I-mage" to --image--.

Signed and Sealed this

Sixteenth Day of June, 2009

JOHN DOLL
*Acting Director of the United States Patent and Trademark Office*